United States Patent Office 3,070,448
Patented Dec. 25, 1962

3,070,448
DIP FOR MEAT WRAPS
Beverly E. Williams, La Grange Park, Ill., assignor to Hodges Research and Development Company, New York, N.Y., a corporation of California
No Drawing. Filed Sept. 14, 1960, Ser. No. 55,830
1 Claim. (Cl. 99—222)

This invention relates to dips for meat wraps and more particularly to dips for preventing off-odor in meat wrap cloths.

Recently the use of plastic coated cloths for the wrapping of beef, lamb and veal carcasses and primal cuts, fronts, hinds, saddles, etc. has come into favor. Such plastic coated cloths are described in U.S. Patent No. 2,699,396 of January 11, 1955, to Carleton S. Francis, Jr. and in U.S. Patent No. 2,697,664 of December 21, 1954, to P. A. Goeser et al.

Heretofore plastic coated cloths have been dipped in 10° to 20° salometer brine before application on the killing floor or in the cooler to the beef, veal or lamb carcass. The brine solution in the cloth retained moisture in the cloth since salt is hygroscopic and this retention of moisture helps to bleach or whiten the surface fat of the carcass. However, after hanging from five to ten days in the cooler and en route to customers via refrigerated cars and trucks, the cloths developed definite off-odor and in many cases the lamb, veal or beef carcasses either became "sticky" or was bleached to a dead white or "flaky fat" condition either of which is objectionable. Thus the use of a 10° to 20° salometer brine on plastic coated cloths is objectionable for three reasons, the prevalence of off-odor after the carcasses have been in the cooler and en route to the trade for from five to ten days and secondly because of the objectionable dead white bleaching of some of the carcasses, and thirdly, because of the development of a "sticky" or "slick" condition on the surface of the carcasses and cuts.

Various substitutes were tried for the salt brine referred to above in an effort to eliminate off-odor and to prevent stickiness and dead white bleaching of the carcass. Sodium hypochlorite from 100 p.p.m. to 200 p.p.m. in aqueous solution was tried both with and without an added small amount of green chlorophyll derivatives, hydrogen peroxide and potassium chlorate. Acetic acid in amounts of from ½% to 2% in aqueous solution was tried, alone, and in combination with the above. Most unexpectedly an acetic acid combination was found to develop a very pleasing "bloom" on the surface of the lamb carcass.

In an effort to determine the best dip for the plastic coated meat wrap cloths the following dips were tried and the carcasses were then rated for appearance, bloom and condition after six days in the coolers. A panel of experts rated the solutions as follows:

(A) Plain tap water.
(B) Tap water plus 200 p.p.m. sodium hypochlorite.
(C) Tap water plus 1% acetic acid.
(D) Tap water plus ½% acetic acid plus 100 p.p.m. sodium hypochlorite.
(E) Tap water plus enough salt to register 10° salometer plus 2% acetic acid plus 200 p.p.m. sodium hypochlorite.
(F) Tap water plus enough salt to register 10° salometer plus 2% acetic acid plus 200 p.p.m. sodium hypochlorite plus 1% of hydrogen peroxide.

"A" was rated unanimously the poorest and "F" was rated unanimously the best of the dips. It was entirely unexpected that a dip of tap water with enough salt to register 10° salometer with 2% acetic acid, 200 p.p.m. sodium hypochlorite and 1% hydrogen peroxide would be the best of the dips in view of the presence of salt which had heretofore been responsible for off-odor in the cloths. Most unexpectedly it was found that the several components of this dip had a truly synergistic effect one on the other. The presence of the brine maintained desirable moisture level on the cloth and on the surface of the carcass; the acetic acid most unexpectedly contributed a desirable "bloom" to the surface of the carcass and prevented dead white bleaching of the carcass by the salt. And the sodium hypochlorite minimized odor-forming bacterial while the peroxide oxidized the Pseudomonas bacteria heretofore apparently encouraged by the hygroscopic characteristic of the salt. All of the cloths dipped in this solution were sweet and clean smelling when removed from the carcasses after from six to ten days in the cooler and en route and the results of this dip unexpectedly exceeded the sum of the results of the components thereof.

The dip described above minimizes the obnoxious odor-forming bacteria which are active in the normal ten-day refrigeration period for the keeping of beef, veal and lamb carcasses. Putrefactive bacteria do not become very active within the usual ten-day period, especially under refrigeration, and so the putrefactive bacteria do not present a problem in the shrouding of beef, lamb and veal carcasses with plastic coated cloths.

It should now be apparent that the preferred dip of the present concept may be varied somewhat in the proportions of components within the concept of the present invention. The amount of salt used can register from 5° to 20° salometer and from 100 p.p.m. to 200 p.p.m. of sodium hypochlorite can be used. The amount of acetic acid may vary from approximately ½% to 2%. The amount of peroxide from ½% to 1%.

Reference should therefore be had to the appended claim to determine the scope of this invention.

What is claimed is:

A dip for plastic coated cloths for wrapping beef, lamb and veal carcasses consisting of an aqueous solution of salt from approximately 5° to 20° salometer; approximately ½% to 2% acetic acid; approximately 100 p.p.m. to 200 p.p.m. sodium hypochlorite and approximately 1% hydrogen peroxide.

References Cited in the file of this patent
UNITED STATES PATENTS

| | | |
|---|---|---|
| 2,673,804 | Paddock | Mar. 30, 1954 |
| 2,697,664 | Goeser et al. | Dec. 21, 1954 |
| 2,699,396 | Francis | Jan. 11, 1955 |
| 2,735,777 | Meyer | Feb. 21, 1956 |